United States Patent [19]
Ohta et al.

[11] Patent Number: 5,527,612
[45] Date of Patent: Jun. 18, 1996

[54] FLUOROCARBON COPOLYMER-INSULATED WIRE

[75] Inventors: Yutaka Ohta; Tamotsu Kaide, both of Amagasaki; Kiyogo Nakagawa; Yosikazu Ebiike, both of Tokyo, all of Japan

[73] Assignee: Mitsubishi Cable Industries, Ltd., Amagasaki, Japan

[21] Appl. No.: 268,854

[22] Filed: Jun. 30, 1994

[30] Foreign Application Priority Data

Jul. 1, 1993 [JP] Japan ................................. 5-190720
Mar. 28, 1994 [JP] Japan ................................. 6-082277

[51] Int. Cl.$^6$ ........................................ B32B 15/00
[52] U.S. Cl. ................... 428/379; 428/380; 428/381; 428/389; 174/120 R; 174/110 FC
[58] Field of Search ...................... 428/379, 383, 428/389; 055282099174/110 SR, 110 FC

[56] References Cited

U.S. PATENT DOCUMENTS

| | | | |
|---|---|---|---|
| 4,575,533 | 3/1986 | Horie et al. | 525/72 |
| 4,637,955 | 1/1987 | Glaister | 428/379 |
| 4,770,937 | 9/1988 | Yagyu et al. | 428/383 |
| 4,882,113 | 11/1989 | Tu et al. | 264/127 |
| 4,960,624 | 10/1990 | Ueno | 428/35.1 |
| 5,057,345 | 10/1991 | Barrett | 428/35.1 |

*Primary Examiner*—N. Edwards
*Assistant Examiner*—J. M. Gray
*Attorney, Agent, or Firm*—Varndell Legal Group

[57] ABSTRACT

A fluorocarbon copolymer-insulated wire comprising, around a conductor, an insulating layer made of a composition comprising an ethylene-tetrafluoroethylene copolymer and an unsintered tetrafluoroethylene-propylene copolymer, which is resistant to heat, abrasion and oil, and improved in flexibility. The wire can be efficiently installed in a narrow space in various equipments and enables easy wiring work.

11 Claims, 1 Drawing Sheet

FLUOROCARBON COPOLYMER-INSULATED WIRE

FIELD OF THE INVENTION

The present invention relates to a fluorocarbon copolymer-insulated wire resistant to heat, abrasion and oil, and having an improved flexibility.

BACKGROUND OF THE INVENTION

The insulated wires for equipments, such as lead wire for motors, wires for vehicles, wires for automobiles and particularly wires for automobiles which are to be used near an engine are requested to have high resistance to heat, abrasion and oil, as well as superior cut-through property. To illustrate heat resistance, an insulated wire for equipments which poses no practical problem in terms of mechanical properties and electrical properties even after an aging test at 200° C. for 40,000 hours is demanded. Conventionally, there are insulated wires for use for equipments, which are manufactured by using fluorocarbon resins such as PTFE (polytetrafluoroethylene), PFA (tetrafluoroethylene-perfluoroalkoxy copolymer), FEP (tetrafluoroethylene-hexafluoropropylene copolymer), ETFE (ethylene-tetrafluoroethylene copolymer) and the like for forming an insulating layer of such wires.

Incidentally, along with the recent miniaturization of equipments and appratuses, the above-mentioned wires for equipments are also required to have, besides the essential properties as recited above, flexibility so as to enable efficient wiring thereof in a narrow space. Despite such requirement, insulated wires having an insulating layer prepared by the use of the aforementioned fluorocarbon resins are poor in flexibility and efficient installing of said wires in a narrow space within the miniaturized equipments is not attainable, also posing difficulty in workability when wiring.

While there has been an insulated wire having an insulating layer prepared by the use of a fluorocarbon rubber, it is susceptible to inferior resistance to abrasion and poor cut-through property. In addition, there has been proposed an insulating composition comprising ethylene-tetrafluoroethylene copolymer and tetrafluoroethylene-propylene copolymer (Japanese Patent Unexamined Publication No. 123444/1977).

SUMMARY OF THE INVENTION

An object of the present invention is to provide a fluorocarbon copolymer-insulated wire resistant to heat, abrasion and oil, and having an improved flexibility.

According to the present invention, a fluorocarbon copolymer-insulated wire comprising an insulated layer formed by a composition comprising an ethylene-tetrafluoroethylene copolymer and an unsintered tetrafluoroethylene-propylene copolymer is provided.

DETAILED DESCRIPTION OF THE INVENTION

Figure 1:
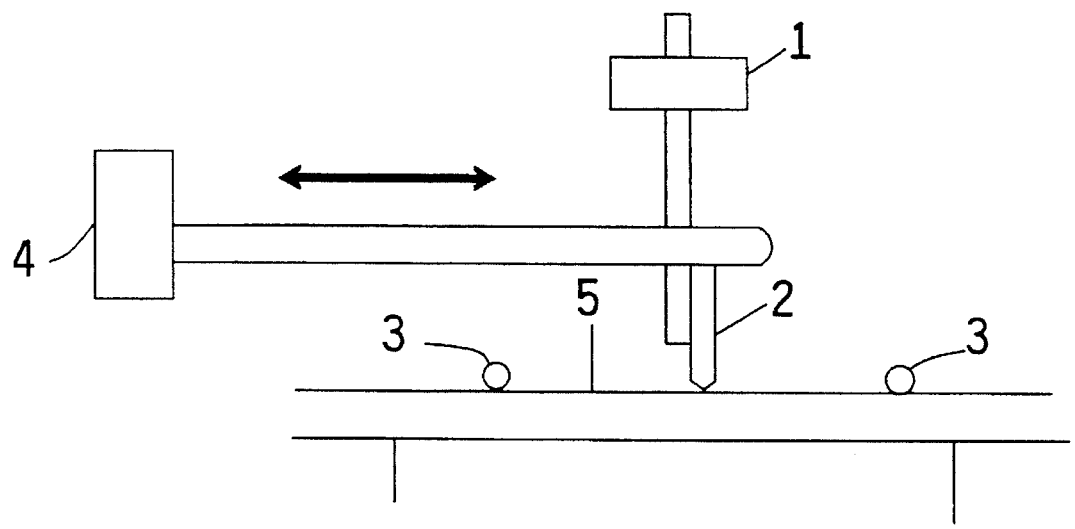
FIG. 1 is a schematic showing of a tester used for determining the abrasion resistance as described in Examples, wherein 1 is a weight, 2 is a blade, 3 is a crump, 4 is a reciprocation device, 5 is an insulated wire to be tested and an arrow indicates the direction of the reciprocation.

The ethylene-tetrafluoroethylene copolymer to be used in the present invention may be known and is exemplified by Aflon COP (manufactured by Asahi Glass Co., Ltd., Japan) and Neoflon EP521 (manufactured by Daikin Industries, Ltd., Japan). The ethylene-tetrafluoroethylene copolymer to be used in the present invention may comprise, besides the main components ethylene and tetrafluoroethylene, a component copolymerizable with these components, such as propylene, butene-1, vinylidene fluoride, vinyl fluoride or hexafluoropropene in a proportion of not more than 50% by mole, preferably not more than 30% by mole of the copolymer.

The molar ratio of ethylene/tetrafluoroethylene in the ethylene-tetrafluoroethylene copolymer is 20/80–70/30, particularly 45/55–60/40 from the viewpoint of heat resistance.

The unsintered tetrafluoroethylene-propylene copolymer to be used in the present invention may comprise, besides the main components tetrafluoroethylene and propylene, a component copolymerizable with these components, such as ethylene, butene-1, vinylidene fluoride, vinyl fluoride or hexafluoropropene in a proportion of not more than 50% by mole, preferably not more than 30% by mole of the copolymer.

The molar ratio of tetrafluoroethylene/propylene in the unsintered tetrafluoroethylene-propylene copolymer is 95–30/5–70, particularly 90–45/10–55.

A tetrafluoroethylene-propylene copolymer is obtained by copolymerizing tetrafluoroethylene and propylene and is conventionally sintered thereafter. The tetrafluoroethylene-propylene copolymer to be used in the present invention needs to be an unsintered one. Examples of the unsintered tetrafluoroethylene-propylene copolymer include Aflas 100 N manufactured by Asahi Glass Co., Ltd, Japan.

The unsintered tetrafluoroethylene-propylene copolymer is preferably added in a proportion of 10–140 parts by weight per 100 parts by weight of the ethylene-tetrafluoroethylene copolymer. When it is added in a proportion of less than 10 parts by weight, the flexibility tends to become poor. When it is added in a proportion of more than 140 parts by weight, the abrasion resistance tends to lower. The unsintered tetrafluoroethylene-propylene copolymer is more preferably added in a proportion of 30–100 parts by weight per 100 parts by weight of the ethylene-tetrafluoroethylene copolymer.

The composition to be used in the present invention comprising an ethylene-tetrafluoroethylene copolymer and an unsintered tetrafluoroethylene-propylene copolymer may comprise stabilizers, fillers, antioxidants, lubricants etc. insofar as the object of the present invention is not impaired.

For example, the stabilizer includes zinc oxide, titanium oxide and antimony oxide. The filler is exemplified by carbon black, aluminum silicate and anhydrous silicic acid. The antioxidant is not subject to any particular limitation and is exemplified by NOCRAC WHITE (N,N'-di-2-naphthyl-p-phenylenediamine, manufactured by Ouchi Shinkosha, Japan), ADEKA STAB AO-60 (tetrakis[methylene-3-(3',5'-di-t-butyl-4'-hydroxyphenyl)propionate]methane, manufactured by Asahi Denkasha, Japan) and SEENOX412S [pentaerythritol-tetrakis(3-lauryl-thio-propionate), manufactured by Shiraishi Calcium Corp., Japan].

The copolymers for the insulating layer of the insulated wire of the present invention may or may not be crosslinked. When crosslinked, abrasion resistance is improved. On the other hand, non-crosslinked insulating layer is superior in resistance to cracking under a high temperature atmosphere (resistance to crack caused by distortion or thermal degradation when exposed to a high temperature atmosphere for relatively long time in a bent state, hereinafter referred to as thermal cracking resistance) to those crosslinked. The improvement in abrasion resistance is requested in all fields where insulated wire is applied. An improvement in the thermal cracking resistance is particularly requested by insulated wires used and installed for automobiles under severe enviromental conditions.

When the copolymers are crosslinked, irradiation by an electron beam may be used, an organic peroxide compound may be used or other method may be employed for this purpose. From the aspects of heat resistance and production efficiency, irradiation by an electron beam is preferable. The dose of the electron beam irradiation is not more than 10 Mrad, preferably 2–10 Mrad. As the organic peroxide compound, any known organic peroxide compound such as dicumyl peroxide may be used. An allyl type compound such as TAIC (triallylisocyanate, manufactured by Nihon Kasei Corp., Japan) may be used for an enhanced crosslinking reaction.

The conductor to be used in the present invention may be a known one such as pure copper wire, annealed copper wire or hard-drawn copper wire, with preference given to an annealed copper-conductor from the aspect of flexibility. The conductor can have a size measured as the cross-sectional area of the conductor of 0.1–3.0 mm$^2$, preferably 0.2–2.5 mm$^2$ and more preferably 0.3–2.0 mm$^2$. When it exceeds 3.0 mm$^2$, a problem may be caused in terms of thermal cracking resistance and when it is less than 0.1 mm$^2$, the wire may be broken.

In the present invention, the conductor may be plated with a metal. The occurrence of cracking in the insulating layer under a high temperature atmosphere is particularly prominent when the conductor is copper. When a metal plating is applied to a copper conductor, the cracking is prohibited. For the metal plating, nickel, tin, silver or the like is appropriately used, with preference given to tin, nickel and particularly to nickel, from the aspect of thermal cracking prohibiting property. The metal plating is preferably 0.1–50 μm, more preferably 0.2–30 μm and most preferably 0.3–20 μm thick. When the thickness thereof exceeds 50 μm, the thermal cracking resistance may be affected and when it is less than 0.1 μm, acceleration of heat deterioration occurs to again cause problems in terms of thermal cracking resistance.

The insulation layer in the present invention is preferably 0.1–2 mm in thickness. More preferably, it is 0.2–1.5 mm and most preferably 0.3–1.2 mm. A thickness more than 2 mm or less than 0.1 mm possibly causes problems in terms of thermal cracking resistance.

In the present invention, an insulating layer is applied to a plated wire by a conventional method such as pressurized extrusion or tubing extrusion. From the aspect of production efficiency and abrasion resistance, tubing extrusion is preferable. When crosslinking is desired, the necessary step as mentioned above is applied after the insulating layer is formed.

The wire insulated with fluorocarbon copolymer has resistance to heat, abrasion and oil, and improved flexibility., and is most preferably used as the insulated wire for equipments such as lead wire for motors, wires for vehicles, wires for automobiles and particularly wires for automobiles, which are used near an engine.

The present invention is explained in detail by the following Examples. The Examples are for illustrating purpose only and do not limit the invention in any way.

The test done in the Examples are as follows:

1. Initial property 1-1. Test specimen:

Four tubular test specimens (about 150 mm long each) prepared by extracting the conductor from the insulated wires obtained in Examples and Comparative Examples. On the center of the surface thereof, bench marks are drawn at 50 mm intervals.

1-2. Calculation of sectional area of the tubular test specimen (a) An outer diameter of the test specimen is measured at 3 points or more and the sectional area is calculated based on the minimum value of the outer diameter of the test specimen and the outer diameter of the conductor, according to the following formula:

$$A = \frac{\pi}{4} (D^2 - d^2)$$

wherein A is sectional area (mm$^2$), D is outer diameter (mm) of test specimen and d is outer diameter (mm) of the conductor.

1-3. Test conditions temperature: room temperature (23°–25° C.)

tensile speed: 200 mm/min test specimens to be kept at room temperature for at least 1 hour before testing 1-4. Test method The test specimens are set in chucks in a precise and correct manner so as not to cause distortion or other inconveniences during the test and drawn at the above speed until they are broken. The maximum tensile load, 100% modulus and elongation at break between bench mark lines are determined.

1-5. Calculation of tensile strength, 100% modulus and elongation (1) The tensile strength is converted to the value per unit area by the following formula:

$$TS = \frac{F}{A}$$

wherein TS is tensile strength (kgf/mm$^2$), F is maximum tensile load (kgf) and A is sectional area (mm$^2$) of the test specimen.

(2) 100% Modulus is converted to the value per unit area by the following formula.

$$M = \frac{T}{A}$$

wherein M is 100% modulus (kgf/mm$^2$), T is tensile load (kgf/mm$^2$) when the test specimen is drawn 200%, and A is sectional area (mm$^2$) of the test specimen.

(3) Elongation is calculated by the following formula based on the distance between bench mark lines upon breakage.

$$El = \frac{l_1 - l_0}{l_0} \times 100$$

wherein El is elongation (%), $l_1$ is the distance (mm) between bench marks upon breakage and $l_0$ is an initial bench mark interval (50 mm).

1.6 Each value obtained is an average of the four test specimens.

2. Heat resistance

The tubular test specimens prepared by extracting the conductor from the insulated wires obtained in Examples and Comparative Examples are placed in a gear oven containing air heated at 250° C. for 240 hours (10 days), taken out, allowed to stand at room temperature for not less than 4 hours and bench mark lines are drawn thereon. The tensile strength and elongation are measured according to 1-4 and 1-5 (1), (3) above, based on which the residual ratio is calculated by the following formula:

$$X_1 = \frac{C_1}{C_0} \times 100$$

wherein $X_1$ is residual ratio (%), $C_0$ is an average before heating and $C_1$ is an average after heating. The sectional area is that obtained in 1-2 before heating.

3. Oil resistance

The tubular test specimens (sealed at both ends with a tape) of an appropriate length which have been prepared by extracting the conductor from the insulated wires obtained in Examples and Comparative Examples are immersed in a test oil at 50°±2° C. for 20 hours, taken out, wiped away excessive oil on the surface and allowed to stand at room temperature for not less than 4 hours. The bench mark lines are drawn thereon and within 96 hours therefrom, tensile strength and elongation are measured according to 1-4 and 1-5 (1), (3) above, based on which the residual ratio is calculated by the following formula.

The outer diameter before and after the immersion in the test oil is measured, based on which increase ratio (swelling ratio) of the outer diameter of the test specimens due to the immersion in the test oil is calculated by the following formula:

$$X_1 = \frac{C_2}{C_0} \times 100$$

wherein $X_1$ is residual ratio, $C_0$ is average outer diameter before the immersion and $C_2$ is average outer diameter after the immersion.

The test oil to be used is a mixture of an equivalent amount (based on weight) of an engine oil and kerosene.

4. Abrasion resistance

Figure 2:
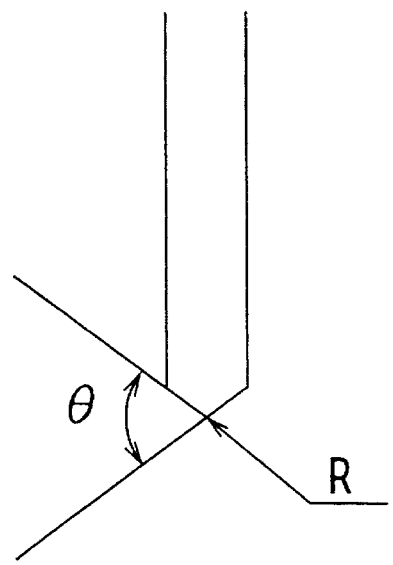
FIG. 2 shows the shape of the blade point, wherein θ is 90° and R indicates R 0.125.

The abrasion resistance is tested by blade reciprocating method by the use of a tester shown in FIGS. 1 and 2 at a room temperature (23±5° C). A blade 2 is reciprocated in the direction of axis on an about 750 mm-long insulated wire 5 to be obtained in Example or Comparative Example and fixed on a table, for a distance of not shorter than 10 mm to cause abrasion. The number of reciprocation until the blade contacts the conductor as a result of the abrasion of the insulating layer when the blade is reciprocated 50 to 60 times per minute is counted. Then, the test specimen is moved 100 mm, turned clockwise for 90 degrees and subjected to the same test as described. The test is done 4 times with the same wire and the smallest count is taken as abrasion resistance. The weight 1 loaded on the blade is 510 g.

5. Cut-through property

The insulated wires obtained in Examples and Comparative Examples are subjected to a cut-through test at room temperature in accordance with UL Subject 758.

6. Thermal cracking resistance

The insulated wires obtained in Examples and Comparative Examples are spirally wound 6 times around a rod having the same diameter as that of the wire and heated at 250° C. under an atmospheric atmosphere for 30 days. Occurrence of crack on the surface of the insulating layer is examined visually. Those which do not suffer from crack occurrence are expressed by ◯, those suffer from crack occurrence are expressed by X and those whose surfaces are heat-melted are expressed by Δ.

Examples 1, 2 and Comparative Example 1

The respective ingredients as shown in Table 1 were heat-melted and kneaded in a kneader and the obtained composition was extruded under pressurization into a 0.35 mm-thick layer on a 0.5 mm² conductor by an extruder set for 325° C. die temperature and 270° C. cylinder temperature. Irradiation by an electron beam was applied on the layer at 5 Mrad to give a fluorocarbon copolymer-insulated wire. With regard to the obtained wires, respective properties were determined. The results are shown in Table 1.

TABLE 1

|  | Example 1 | Example 2 | Comp. Ex. 1 |
|---|---|---|---|
| Ethylene-tetrafluoro-ethylene copolymer[1] (parts by weight) | 80 | 70 | — |
| Unsintered tetrafluoro-ethylene-propylene copolymer[2] (parts by weight) | 20 | 30 | 100 |
| Crosslinking | electron beam irradiation | electron beam irradiation | electron beam irradiation |
| Initial property |  |  |  |
| T · S (kgf/mm²) | 4.19 | 3.34 | 1.73 |
| El (%) | 335 | 313 | 159 |
| modulus 100% (kgf/mm²) | 2.01 | 1.85 | 1.05 |
| Heat resistance |  |  |  |
| residual T · S (%) | 56 | 62 | 69 |
| residual El (%) | 78 | 80 | 110 |
| Oil resistance (mixed oil) |  |  |  |
| residual T · S (%) | 91 | 87 | 70 |
| residual El (%) | 100 | 90 | 93 |
| swelling ratio (%) | 1 | 1 | 3 |
| Abrasion resistance average counts (times) | 2050 | 1540 | 64 |
| Cut-through property (kg) | 20 or more | 20 or more | 5.72 |

Note:
[1] Aflon COP, Asahi Glass Co., Ltd.
[2] Aflas 100N, Asahi Glass Co., Ltd.
T · S = tensile strength
El = elongation Examples 3–5

Each component as shown in Table 2 were heat-melted, kneaded and formed into pellets by a biaxial extruder or a kneader and the obtained pellets were subjected to tubing extrusion by an extruder set for die temperature 325° C. and cylinder temperature 270° C. to form a 0.38 mm-thick layer on a 0.5 mm² annealed copper conductor which had been applied with a metal plating as shown in Table 2 (1.5 μm thick) to give a fluorocarbon copolymer-insulated wire.

Example 6

In the same manner as in Example 5 except that the thickness of the insulating layer was set for 3.0 mm, a fluorocarbon copolymer-insulated wire was obtained.

Comparative Example 2

In the same manner as in Example 3 except that the components as shown in Table 2 were used and the thickness of the insulating layer was set for 3.0 mm, a fluorocarbon copolymer-insulated wire was obtained.

The respective properties of each insulated wire manufactured as in the above were determined. The results are shown in Table 2.

TABLE 2

|  | Ex. 3 | Ex. 4 | Ex. 5 | Ex. 6 | Co. Ex. 2 |
|---|---|---|---|---|---|
| Ethylene-tetra-fluoroethylene copolymer[(1)] (parts by weight) | 70 | 60 | 50 | 50 | 100 |
| Unsintered tetra-fluoroethylene-propylene copolymer[(2)] (parts by weight) | 30 | 40 | 50 | 50 | 0 |
| Kind of metal plating | tin | tin | nickel | tin | tin |
| Crosslinking | none | none | none | none | none |
| Thickness of insulating layer (mm) | 0.38 | 0.38 | 0.38 | 3.0 | 0.3 |
| Initial property |  |  |  |  |  |
| T · S (kgf/mm$^2$) | 4.03 | 3.63 | 2.48 | 2.33 | 4.00 |
| El (%) | 367 | 349 | 293 | 287 | 312 |
| modulus 100% (kgf/mm$^2$) | 1.93 | 1.83 | 1.42 | 1.40 | 2.46 |
| Heat resistance |  |  |  |  |  |
| residual T · S (%) | 66.2 | 76.9 | 86.7 | 77.4 | 73.3 |
| residual El (%) | 85.8 | 108.9 | 116.4 | 107.8 | 79.6 |
| Oil resistance (mixed oil) |  |  |  |  |  |
| residual T · S (%) | 98.5 | 97.2 | 107.2 | 92.0 | 103.0 |
| residual El (%) | 93.5 | 89.4 | 92.3 | 90.2 | 107.4 |
| swelling ratio (%) | <1.0 | <1.0 | 2.0 | 2.0 | <1.0 |
| Abrasion resistance average counts (times) | 750 | 590 | 200 | 100 | >3000 |
| Cut-through property (kg) | >20 | >20 | >20 | >20 | >20 |
| Thermal cracking resistance | ○ | ○ | ○ | Δ – X | Δ – X |

Note:
[(1)]Aflon COP, Asahi Glass Co., Ltd.
[(2)]Aflas 100N, Asahi Glass Co., Ltd.
T · S = tensile strength
El = elongation The fluorocarbon copolymer-insulated wire of the present invention has resistance to heat, abrasion and oil, and is superior in flexibility. Accordingly, the wire can be efficiently installed in a narrow space in various equipments and enables easy wiring work. As a result, the wire can be sufficiently applied as an insulated wire having resistance to a high temperature atmosphere of 200° C. level. In addition, the fluorocarbon copolymer-insulated wire of the present invention eliminates crack occurrence in the insulating layer of the wire even when installed under a high temperature atmosphere in a bent state and renders the wire an extremely advantageous one for installing in an equipment for automobile etc.

What is claimed is:

1. A fluorocarbon copolymer-insulated wire comprising, around a conductor, an insulating layer made of a composition comprising an ethylene-tetrafluoroethylene copolymer and an unsintered tetrafluoroethylene-propylene copolymer, in a proportion of 10–140 parts by weight of the unsintered tetrafluoroethylene-propylene copolymer per 100 parts by weight of the ethylene-tetrafluoroethylene copolymer.

2. The insulated wire of claim 1, wherein the copolymers for the insulating layer are crosslinked.

3. The insulated wire of claim 1, wherein the copolymers for the insulating layer are non-crosslinked.

4. The insulated wire of claim 1, wherein the insulating layer is 0.1–2 mm in thickness.

5. The insulated wire of claim 1, wherein the conductor is plated with a metal.

6. The insulated wire of claim 5, wherein the metal plating is nickel plating.

7. The insulated wire of claim 5, wherein the metal plating has a thickness of 0.1–50 μm.

8. The insulated wire of claim 1, wherein a molar ratio of ethylene/tetrafluoroethylene in the ethylene-tetrafluoroethylene copolymer is 20/80–70/30.

9. The insulated wire of claim 1, wherein a molar ratio of tetrafluoroethylene/propylene in the unsintered tetrafluoroethylene-propylene copolymer is 95–30/5–70.

10. The insulated wire of claim 1, wherein the proportion of the unsintered tetrafluoroethylene-propylene copolymer is 30–100 parts by weight per 100 parts by weight of the ethylene-tetrafluoroethylene copolymer.

11. A fluorocarbon polymer-insulated wire consisting essentially of a conductor coated with a composition of an ethylene-tetrafluoroethylene copolymer and an unsintered tetrafluoroethylene-propylene copolymer, in a proportion of 10–140 parts by weight of the unsintered tetrafluoroethylene-propylene copolymer per 100 parts by weight of the ethylene-tetrafluoroethylene copolymer.

* * * * *